United States Patent Office 2,922,496
Patented Jan. 26, 1960

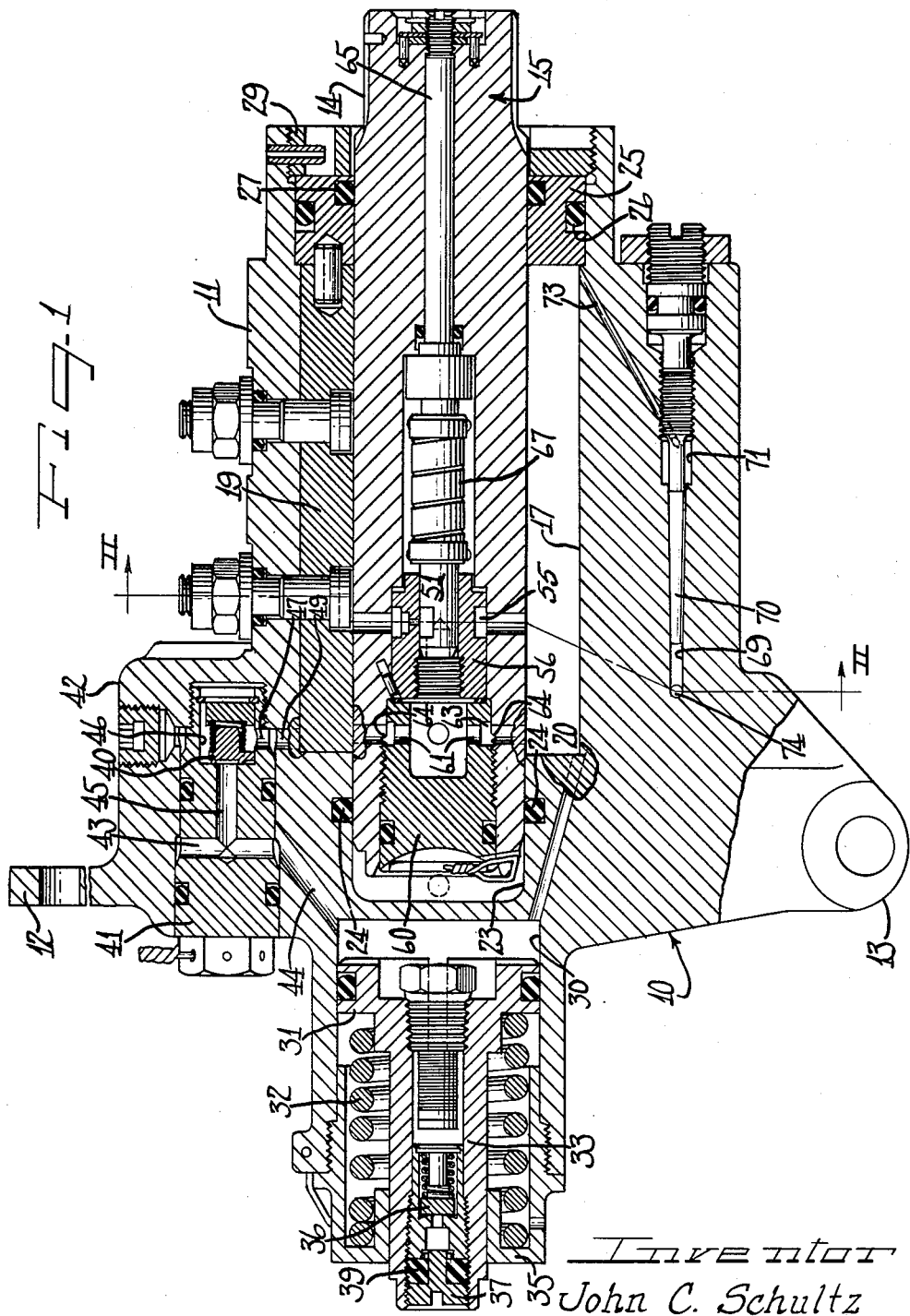

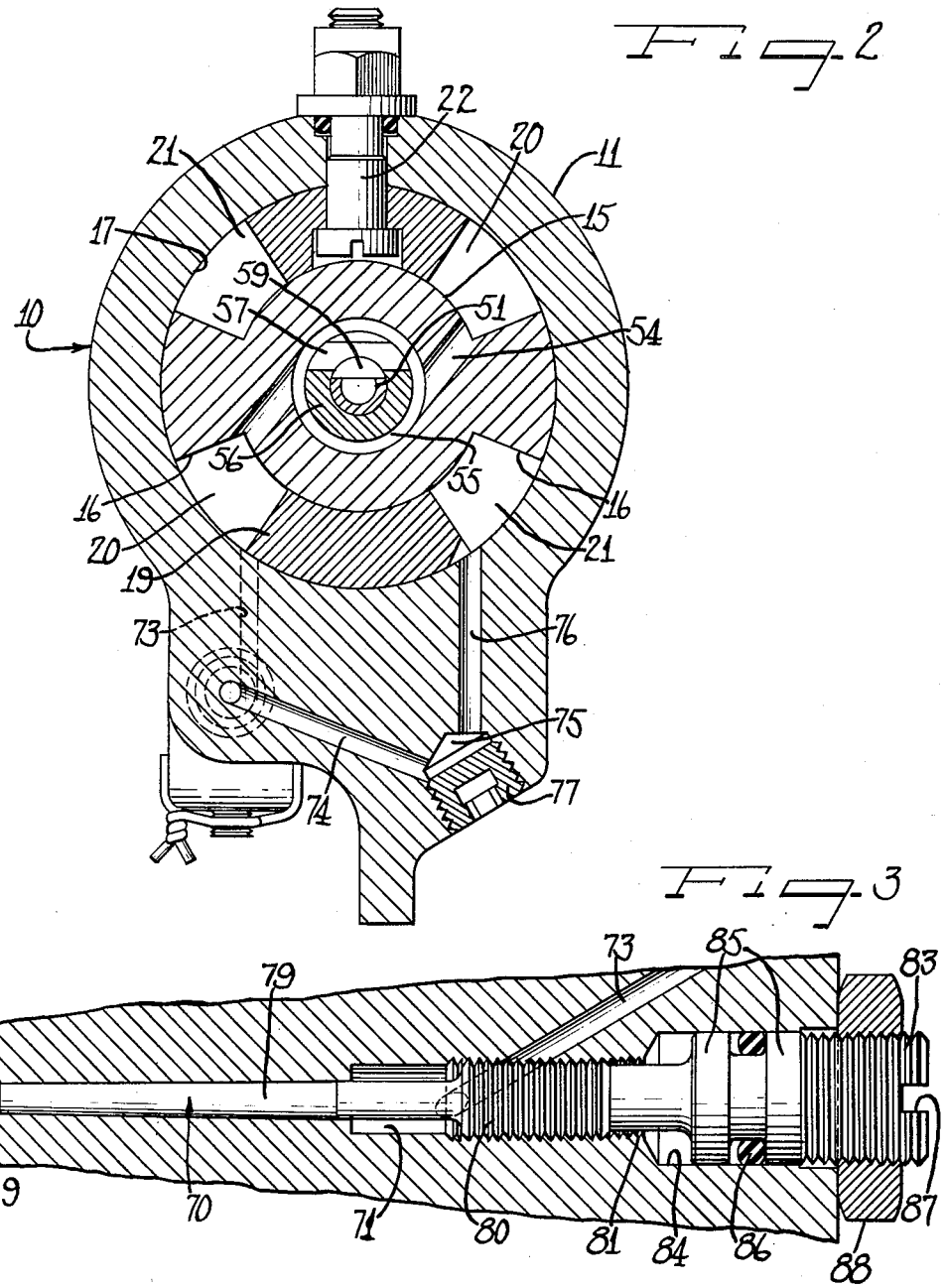

2,922,496
RUDDER FLUTTER DAMPER

John C. Schultz, Buffalo, N.Y., assignor to Houdaille Industries Inc., a corporation of Michigan Application September 15, 1955, Serial No. 534,508

2 Claims. (Cl. 188—93)

This invention relates to improvements in dampers particularly adapted to damp the flutter of the adjustable airfoil members of aircraft.

Heretofore, with flutter dampers of the rotary vane type having a cylinder structure and a rotary piston structure and having an orifice valve controlling the passage of oil from the working chambers of decreasing volume to the working chambers of increasing volume, where differences in machining tolerances change the operation of the damper from a mean optimum operating value, it has been necessary in the commercial forms of flutter dampers in use at the present day to dismantle the damper and change the orifice valve to bring the damper up to a mean standard.

A principal object of my invention is to remedy the foregoing difficulties and improve the efficiency of the damper by assuring that an equal amount of oil be handled by the orifice valve regardless of variations in machining tolerances from mean optimum tolerances by providing adjustable passageway means to simulate leakage past the vanes of the damper and adjustable to effect the passage of a uniform quantity of hydraulic fluid through the orifice control valve for a wide range of variation in machining tolerances of each individual damper from mean machining tolerances.

Another object of the invention is to provide a simplified and novel means to counteract the effect of leakage past the vanes of a rotary vane type of flutter damper, due to machining tolerances.

Another object of the invention is to counteract the effect of leakage of a rotary vane type of damper due to machining tolerances by connecting a working chamber of decreasing volume with a working chamber of increasing volume of the damper with a valve adjustable along a long orifice to provide an attenuated leakage passageway past the vanes of the damper.

Still another object of the invention is to provide an equal amount of oil to be handled by the orifice valve of a rotary vane type of individual flutter dampers by connecting a working chamber of decreasing volume with a working chamber of increasing volume with an elongated tapered chamber, and by providing an elongated metering valve in the chamber giving an attenuated flow passage adjustable to compensate for excess or insufficient leakage past the vanes of the damper due to variations in machining tolerances of the damper from mean optimum tolerances, and to thereby enable the damper to conform to standard damping characteristics.

Another object of the invention is to provide a novel and improved form of a needle valve adjustable along a long orifice or chamber and providing an adjustable attenuated flow passageway simulating leakage past the vanes of a rotary piston type of flutter damper.

A still further object of the invention is to provide a simple and improved form of valve in the form of an elongated tapered metering pin adjustable along a corresponding tapered passageway for providing an equal amount of oil to be handled by the orifice valve of various rotary vane types of flutter dampers regardless of variations in machining tolerances from mean optimum tolerances.

These and other objects of the invention will appear from time to time as the following specification proceeds and with references to the accompanying drawings wherein:

Figure 1 is a schematic longitudinal sectional view taken through a rotary damping structure constructed in accordance with my invention with certain parts thereof broken away;

Figure 2 is an enlarged transverse sectional view taken substantially along line II—II of Figure 1; and Figure 3 is an enlarged detail view of the metering valve in position in its chamber or orifice.

In the embodiment of the invention illustrated in the drawings, reference character 10 designates generally a flutter damper constructed in accordance with my invention and suitable of being contained in free working relation within the front or joint portion of a movable control surface member of an airplane airfoil assembly, such as a rudder, elevator, stabilizer or the like, to damp the tendency of the airfoil assembly to flutter.

The flutter damper 10 is shown as being a rotary vane hydraulic piston type of damper comprising an elongated cylinder or envelope structure 11, which may be mounted coaxially with the hinged axis of a pivoted rudder or other airfoil member (not shown), and which may be attached thereto by attachment brackets 12 and 13, extending laterally therefrom for attachment to suitable brackets (not shown), usually carried interiorly of the movable control member of the airplane.

The cylinder structure 11 has a rotary piston 15 carried therein and projecting from one end thereof. The projecting end portion of the rotary piston is shown as being splined, as indicated by reference character 14, and usually connected to a stationary part of the airplane.

The rotary piston 15, commonly called a wing shaft, is provided with a pair of diametrically opposed laterally projecting vanes or wings 16 extending longitudinally therealong from one end thereof to another of an interior chamber 17 of the cylinder structure 11. Diametrically opposed reaction members or dividers 19 extend along the interior chamber 17 of the cylinder structure 11 and have slidable engagement with the piston 15 between the vanes 16 thereof, and with said vanes define a plurality of working chambers 20 and 21. The dividers 19 are shown as being held in position within the inner cylindrical wall of the cylinder structure 11 by retaining screws 22 extending through said dividers and the wall of said cylinder structure and suitably sealed thereto.

At the opposite end of the chamber 17 from the projecting end of the rotary piston 15 is a reduced diameter chamber 23 rotatably carrying the inner end portion of the piston 15 and sealing said end portion of said piston to said chamber as by an O-ring 24. The outer end portion of the rotary piston 15 is rotatably carried in a sealing member 25 sealed to the interior wall of the piston 17 by an O-ring 26 and sealed to the piston 15 by an O-ring 27. A retaining nut 29 is provided to retain the sealing member 25 in position.

Hydraulic fluid under pressure is introduced into the damper 10 through a replenishing chamber 30 pressurized by a piston 31 and preloaded spring 32 biasing said piston in a direction to introduce and maintain fluid under pressure in the damper. The replenishing chamber 30 and piston 31 may be of a form well known to those skilled in the art and are no part of the present invention, so only herein shown and described in sufficient detail to render may present invention readily understandable.

The piston 31 has an integrally formed sleeve 33 extending outwardly therefrom and slidably guided in an end cap member 35 threaded within the replenishing chamber 30. The sleeve 33 has a check valve 36 therein to accommodate the introduction of fluid under pressure within said replenishing chamber and to block the back flow of fluid from said replenishing chamber. A closure plug 37 is threaded within the end portion of the sleeve 32 and is sealed to the interior thereof as by a resilient seal 39.

Fluid under pressure is introduced into the working chamber 20 under the control of a check valve 40 in a plug 41 threaded within an enlarged boss-like portion 42 of the cylinder structure 11 and extending axially of said cylinder structure. The plug 41 has a cross-drilled passageway 43 communicating with the replenishing chamber 30 through a passageway 44 leading from the end of said replenishing chamber. The passageway 45 leads from the cross-drilled passageway 43 and opens into a hollow portion 46 of the plug 41 within which the check valve 40 is carried. A cross-drilled passageway 47 leading from the hollow portion 46 of the plug 41 communicates with a passageway 49 leading to the chamber 20.

A similar check valve and passageway arrangement is provided to replenish fluid in the chamber 21. Said check valve and passageway need not herein be shown or described further since they form no part of my present invention and may be of any well known form.

Hydraulic fluid under pressure introduced into the damper 10 from the replenishing chamber 30 through check valves 40 is displaced from the working chambers 20 to the working chambers 21 and vice versa, under the control of a fluid displacement orifice control valve 51 in a hollow interior portion of the rotary piston 15. Fluid displacement ports 54 are shown as leading from the chambers 20 and as having communication with an annular outwardly opening passageway 55 formed in an orifice body 56 mounted within the hollow interior portion of the rotary piston 15. The annular passageway 55 communicates with a slit-like chordal control orifice 57 extending transversely of the orifice body 56 and shown as intersecting the orifice control valve 51 rotatably mounted in the center of the orifice body 56.

The orifice control valve 51 may be of a form well known to those skilled in the art and is of a generally cylindrical form having an open inner end, having a chordal slit 59 extending within and having communication with the slit-like chordal control orifice 57. Rotatable adjustment of the orifice control valve 51 within the orifice body 56 will thus vary the cross-sectional passageway area between the chordal orifice 57 and the chordal slit 59 and vary the restriction of the flow of fluid through said slit and out through the valve through the hollow interior thereof into a hollow end plug 60, threaded within the inner end of the rotary piston 15. The hollow end plug 60 is shown as having cross-drilled passageways 61 communicating with an annular passageway 63 extending thereabout and having communication with passageways 64 leading to the chambers 21.

The orifice control valve 51 is turned within the orifice body 56 by means of a rod 65 extending within the rotary piston 15 from the outer end thereof into the hollow interior portion 53 of said rotary piston. A spiral bi-metal thermostatic element 67 is secured at one of its ends to the inner end of the rod 65 and at its other end to the orifice control valve 51, to vary the flow orifice leading through said valve upon variations in temperature encountered in the service of the aircraft, by rotatably moving said orifice control valve to restrict or open the orifice from a mean temperature rate of adjustment, and thus compensates for changes in viscosity of the damping fluid as the temperature changes. The position of the orifice control valve 51 may also be varied by adjustably turning the rod 65 by hand to rotatably position said valve through the spiral thermostatic element 57.

Referring now in particular to the means for equalizing the amount of oil handled by the orifice control valve 51 and to compensate for variations in leakage past the vanes or wings 16 and 19 due to variations in machining tolerances, a tapered passageway or chamber 69, and a high pitch long needle or metering valve 71, are provided in the cylinder structure 11. The working chambers 20 and 21 have communication with opposite ends of the chamber 69 on opposite sides of a wing or vane 19. As herein shown, the tapered valve chamber 69 extends in the direction of the axis of the piston 15 and is spaced therebeneath, although it may be in any desired location. The large diameter end of the tapered chamber 69 terminates into an axially aligned enlarged diameter chamber 71 opening to the end of the cylinder structure 11 and having the needle valve 70 threaded therein. A passageway 73 leads from the working chamber 20 to the chamber 71 to admit hydraulic oil under pressure to the large diameter end of tapered chamber 69. A passageway 74 is shown as leading transversely across the cylinder structure 11 from the reduced diameter end of the tapered chamber 69, to a threaded bore 75 in the cylinder structure 11. A passageway 76 leads from the working chamber 21 to the threaded bore 75 to afford a communicating passageway from the chamber 21 to the small diameter end of the tapered chamber 69, through the threaded bore 75 and passageway 74. The threaded chamber 75 is closed by a plug 77 threaded within the outer end thereof to seal the same. The plug 77 may be made of tin or a like material softer than the metal of the cylinder, to attain a tight seal to hold fluid within the chamber 61 under high pressure conditions, without leaking.

The needle or metering valve 70 has a long tapered metering or valve surface 79 extending within the tapered chamber 69 and having a taper corresponding to that of said tapered chamber. The needle valve 70 also has an intermediate threaded portion 80 spaced outwardly from the tapered portion 79 and threaded within a threaded portion 81 of the chamber 71. The metering valve 70 also has a head 83 rotatably carried in an enlarged diameter portion 84 of the chamber 71 and opening to the outside of the cylinder structure 11. As herein shown, the head 83 has spaced lands 85 rotatably carried within the enlarged diameter portion 84. A sealing ring, such as, an O-ring 86 is carried in the space between the lands 85 to seal the valve chamber. The outer end of the head 83 is slotted as indicated by reference character 87 to afford a means for adjusting the valve in accordance with the amount of oil necessary to by-pass the orifice control valve 51 to equalize the oil handled by said valve. A lock nut 88 is threaded on the head 83 and engages the end of the cylinder structure 11 to lock the needle valve in position when once properly adjusted.

It may, therefore, be seen that the needle or metering valve 70 connected between the working chambers 20 and 21, thus controls the amount of fluid by-passing the orifice control valve 51 and thereby provide a uniform leakage past the vanes 16 and 19 for various dampers of the same capacity regardless of variations in machining tolerances of the dampers. In cases where the machining tolerances may be at a maximum and there is a maximum amount of leakage past the vanes 16 and 19, the valve 70 may be entirely closed, to compensate for the fluid by-passing the orifice control valve 51 by leaking along the vanes 16 and 19.

Where the tolerances are exceedingly close and there is little, if any leakage, the valve 70 may be opened sufficiently to by-pass a quantity of fluid past the orifice valve equal to the fluid by-passed past the vanes when the tolerances are such that leakage is at a maximum rate.

Thus when it is known what the maximum leakage may be, based on maximum and minimum tolerances in machining, the needle valve 70 may be adjusted to equalize the amount of oil passing through the orifice valve for the various tolerances that may be encountered.

The high pitch long needle valve and its corresponding tapered chamber 69, thus give an attenuated flow passage orifice simulating the leakage past the flutter damper vanes which may be adjusted at will to provide a constant leakage past the orifice control valve regardless of the machining tolerances that may be encountered. A single orifice control valve to be used for the variations in machining tolerances that may be encountered, thus avoiding the necessity of dismantling the damper to provide different orifice control valves for different variations in machining tolerances.

It will be understood that modifications and variations in the present invention may be effected without departing from the spirit and scope of the novel concepts thereof.

I claim as my invention:

1. In a mechanical flutter damper for damping high frequency airfoil vibration and accommodating free airfoil adjustment, a cylinder structure normally filled with hydraulic fluid and having opposed stationary vanes therein, a rotary piston within said cylinder structure and having a pair of opposed rotary vanes cooperating with said stationary vanes to form a plurality of varying volume working chambers, a main thermostatic hydraulic fluid displacement orifice control valve in said piston which in normal operation meters most of the operating fluid between the working chambers and which is constantly open with the opening varying in size in accord with temperature changes to effect resistance to flutter, a tapered passageway within said cylinder structure spaced from said working chambers and having communication at one end with one working chamber on one side of a stationary vane thereof and at its other end with another of said working chambers at the opposite side on the stationary vane thereof, and a tapered needle valve extending within said tapered passageway and adjustable to accommodate leakage between said working chambers to compensate for variations in leakage past said vanes from mean leakage rates due to variations in machining tolerances of the damper from mean optimum tolerances.

2. In a hydraulic flutter damper including a cylinder structure and a piston structure movably carried therein and dividing said cylinder structure into working chambers of decreasing and increasing volume, main orifice control valve means in the piston structure which are constantly open and which meter most of the operating fluid from the chambers of decreasing volume to those of increasing volume during normal operation of the damper, a tapered chamber in said cylinder structure forming a communicating passageway between the chambers of decreasing volume and those of increasing volume, and a high pitch elongated needle valve extending within said tapered chamber and providing an attenuated flow passageway between the working chambers of decreasing and increasing volume, said needle valve being adjustably movable along said tapered chamber to vary the leakage of fluid therethrough and to compensate for variations in hydraulic fluid leaking past said orifice control valve due to variations in machining tolerances from mean optimum tolerances.

References Cited in the file of this patent

UNITED STATES PATENTS

| | | |
|---|---|---|
| 310,129 | Bacon et al. | Dec. 30, 1884 |
| 1,241,084 | Bommer | Sept. 25, 1917 |
| 1,914,677 | Shultz | June 20, 1933 |
| 1,992,569 | Doty | Feb. 26, 1935 |
| 2,194,002 | Begg | Mar. 19, 1940 |
| 2,286,516 | Swanson | June 16, 1942 |
| 2,516,781 | Magrum et al. | July 25, 1950 |
| 2,683,505 | Girard | July 13, 1954 |
| 2,742,113 | O'Conner | Apr. 17, 1956 |

FOREIGN PATENTS

| | | |
|---|---|---|
| 888,636 | France | Sept. 13, 1943 |